(No Model.) 2 Sheets—Sheet 2.
F. E. PARKE.
HAND TRUCK.
No. 514,866. Patented Feb. 13, 1894.
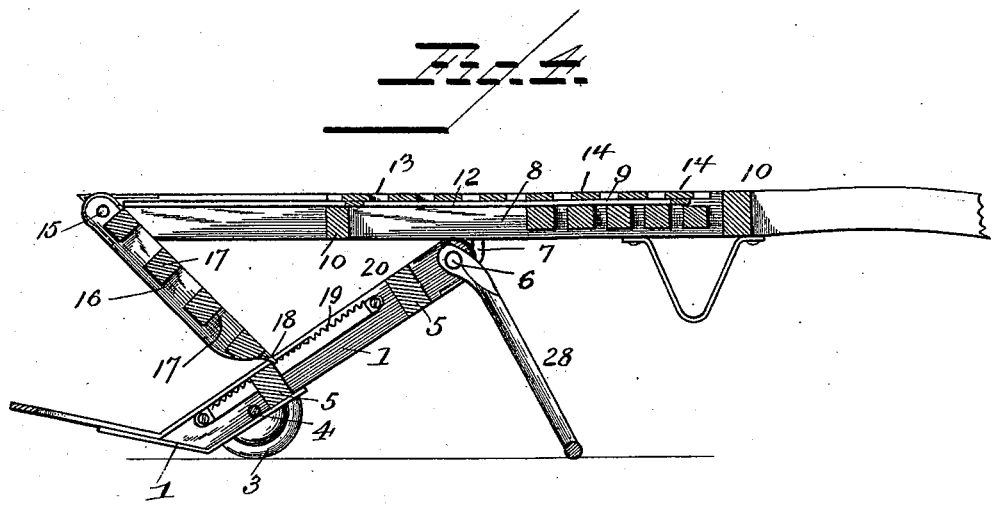
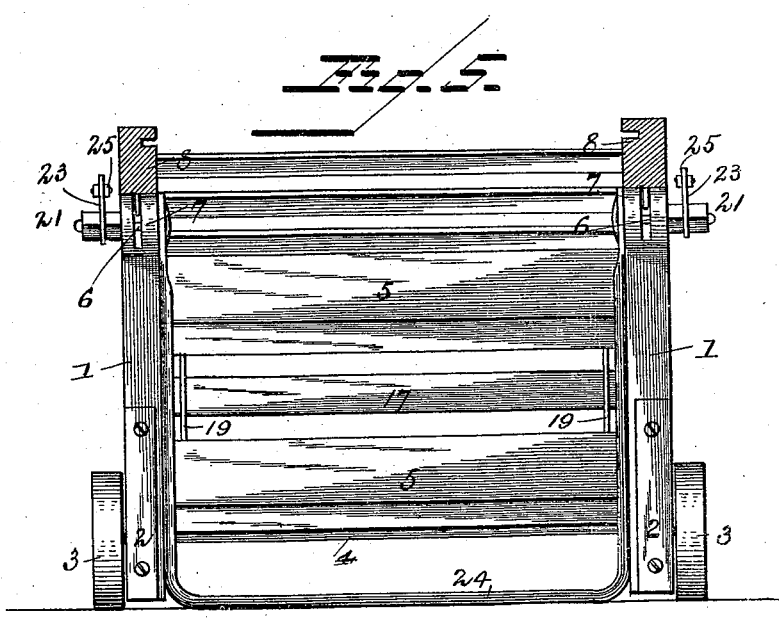
WITNESSES:
F. L. Ourand
H. L. Coombs
INVENTOR:
Francis E. Parke
James Bagger
Attorneys.

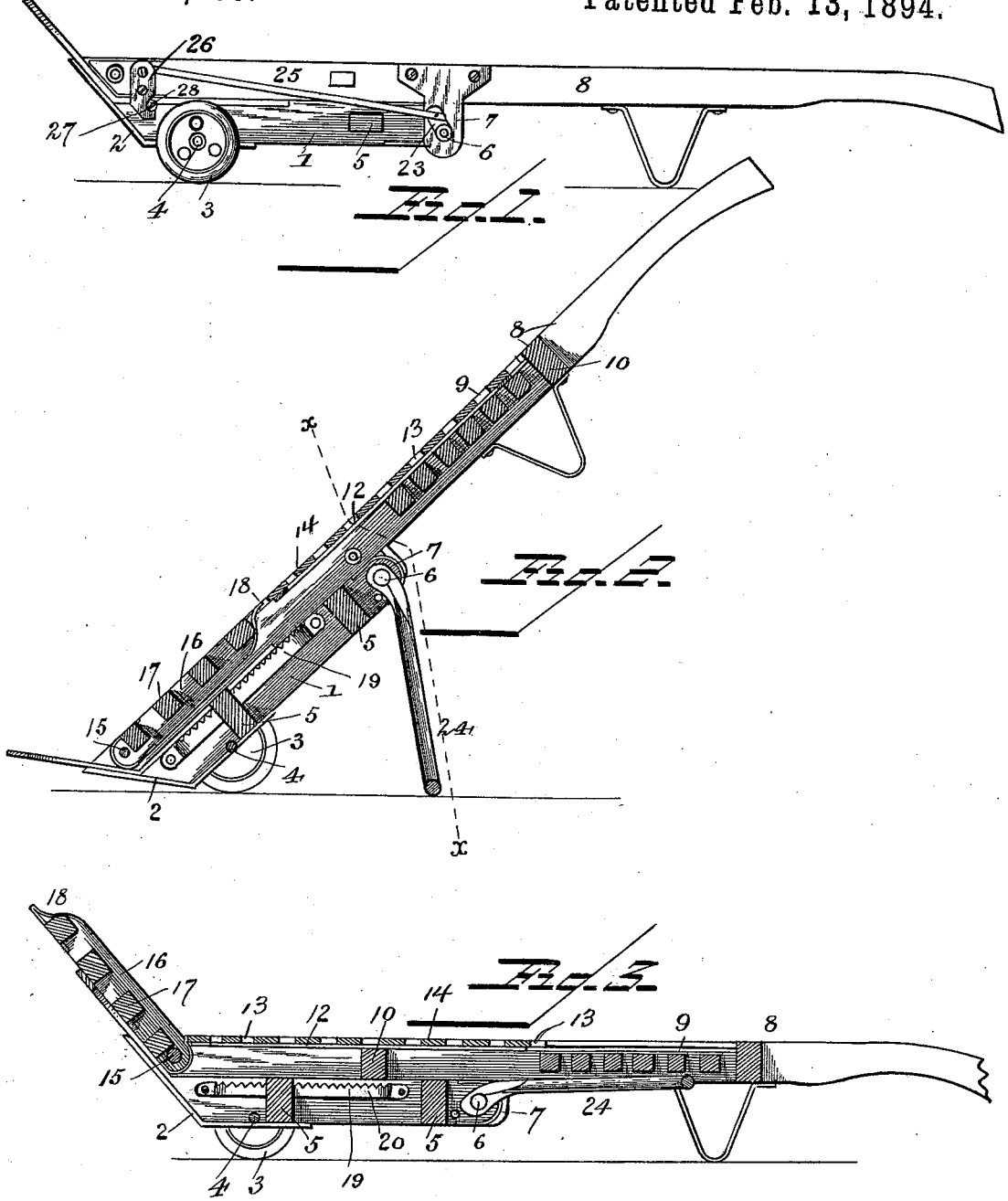

UNITED STATES PATENT OFFICE.

FRANCIS EDWARD PARKE, OF TALIHINA, INDIAN TERRITORY, ASSIGNOR OF ONE-HALF TO JOHN J. THOMAS, OF SAME PLACE.

HAND-TRUCK.

SPECIFICATION forming part of Letters Patent No. 514,866, dated February 13, 1894.

Application filed October 11, 1893. Serial No. 487,853. (No model.)

*To all whom it may concern:*

Be it known that I, FRANCIS EDWARD PARKE, a citizen of the United States, and a resident of Talihina, Choctaw Nation, Indian Territory, have invented certain new and useful Improvements in Hand-Trucks; and I do hereby declare that the following is a full, clear, and exact description of the invention, which will enable others skilled in the art to which it appertains to make and use the same, reference being had to the accompanying drawings, which form a part of this specification.

My invention relates to improvements in hand trucks of that class or description designed for moving heavy articles such as barrels, boxes and other similar objects.

The object of the invention is to provide a truck which is designed more especially for transporting stone and other very heavy objects from place to place, but which may also be employed for moving barrels and boxes of lighter weight.

The invention consists in the novel construction and combination of parts hereinafter fully described and claimed.

In the accompanying drawings: Figure 1 is a side elevation of a truck constructed in accordance with my invention, when used as a barrel truck. Fig. 2 is a longitudinal section of the same showing the handles elevated and the bail turned down to serve as a fulcrum in elevating the front of the truck. Fig. 3 is a longitudinal section showing the apparatus in position to be used as a stone truck. Fig. 4 is a longitudinal section showing the apparatus in the act of dumping, when used as a barrel truck. Fig. 5 is a cross section on line *x—x*, Fig. 2.

In the said drawings the reference numeral 1 designates two short strong beams connected together at the front ends by the iron cross bar 2, and provided with wheels 3, mounted on axle 4, as usual. These beams are connected together by transverse bars 5, and at their rear ends are provided with short shafts 6, on which are journaled plates 7, secured to long beams 8, formed at their rear ends into handles, and on their inner sides provided with grooves 9. These beams are connected together by transverse bars 10, which support a slidable rectangular frame 12, the side bars of which engage with and work in the said grooves. Secured to and removable with this frame is a platform consisting of side and transverse bars 13 and 14.

Secured to the front ends of beams 8, is a transverse rod 15, to which is pivoted a table or swinging platform consisting of side bars 16 and transverse bars 17. At its free end this platform is provided with metal strips bent so as to form projections 18, which engage with teeth 19, on rack bars 20, secured to the inner sides of beams 1.

The outer ends of shafts 6, are provided with nuts 21, between which are clamped cranks 23, through which said shafts pass, while to the inner ends of said shafts are secured the ends of a bail 24, by which they are oscillated as hereinafter described. To the cranks 23 which move with the shafts are pivoted the rear ends of connecting bars 25, the front ends of which are bent into hooks which engage with apertures in the upper ends of catches 26, pivoted to beams 8. The lower ends of these catches are formed with notches 27, which engage with studs 28 on the front ends of beams 1.

The operation is as follows: When used as a stone truck the pivoted platform is swung forward as seen in Fig. 3, and the slidable platform moved to near the front ends of beams 8, the beams 1 and 8 being held to each other by the catches 26 and the studs 28. By now elevating the handles the pivoted platform can be lowered so that the stone or other object can be placed on the truck and transported to destination. To dump the load, the handles are elevated and the bail 24 is turned to about a right angle to the beams, which will disengage the catches 26 from studs 27. By now depressing the handles, using the bail as a fulcrum, the parts will assume the position shown in Fig. 4, dumping the load. When used as a barrel truck, the slidable platform is moved to the rear of the truck and the pivoted platform swung inward as seen in Fig. 2. A barrel can now be placed on the truck and dumped in the ordinary manner. To elevate a barrel so that it can be placed upon a second tier or upon a stand, the bail is turned down as shown in Fig. 2. The front end of the truck is now elevated by depressing the handles, the bail serving as a fulcrum. The pivoted platform will now fall down, the projections 18, engaging with the teeth 19, of the rack bars 20, and holding the truck in the position shown in Fig. 4. From this it will be seen that the barrel can be readily transferred to a stand or other elevated support.

Having thus described my invention, what I claim is—

1. In a convertible hand truck, the combination with the short beams having front end connecting bar and wheels, of the long beams pivoted thereto, the slidable platform and the pivoted platform; substantially as described.

2. In a convertible hand truck, the combination with the short beams having front end connecting bar and provided with wheels, of the long beams pivoted thereto, the slidable platform, the pivoted platform, the shafts journaled in the rear ends of said short beams, the bail secured to said shafts, the cranks, the connected rod, the catches pivoted to said long beams having notches at their lower ends, and the studs on said short beams with which said catches engage; substantially as described.

3. In a convertible hand truck, the combination with the short beams, having front end connecting bar and provided with wheels, and the long beams pivoted thereto having grooves in their inner sides, of the rectangular slidable frame working in said grooves, the platform secured thereto and moving therewith, the pivoted platform having metal strips at its free end, the rack bar with which said strips engage, the shafts journaled in the rear ends of said short beams, the cranks secured thereto, the connecting rods, the notched catches, the studs with which said catches engage and the bails connected with the inner end of said shafts; substantially as described.

In testimony that I claim the foregoing as my own I have hereunto affixed my signature in presence of two witnesses.

FRANCIS EDWARD PARKE.

Witnesses:
SAM. T. ROBERTS, Jr.,
CLAUD MCMURTREY.